United States Patent [19]

Bainbridge et al.

[11] Patent Number: 4,633,896
[45] Date of Patent: Jan. 6, 1987

[54] OPERATING NUT FOR FIRE HYDRANT

[75] Inventors: Gary R. Bainbridge, Tonawanda; Lewis D. McCauley, Snyder; Jeffrey R. Sullivan, Boston, all of N.Y.

[73] Assignee: McGard, Inc., Buffalo, N.Y.

[21] Appl. No.: 834,548

[22] Filed: Feb. 28, 1986

[51] Int. Cl.⁴ .......................... F16K 35/06; E03B 9/06
[52] U.S. Cl. ..................... 137/296; 137/800; 137/382.5; 220/85 P; 220/284; 251/291
[58] Field of Search ............... 137/296, 382, 382.5, 137/371, 377, 381, 382.5, 800; 220/85 P, 284, 285, 286; 215/213, 215; 251/291, 292

[56] References Cited

U.S. PATENT DOCUMENTS

| Re. 27,616 | 4/1973 | Diaz | 137/382.5 |
| 3,070,115 | 12/1962 | Jester | 137/296 |
| 3,453,897 | 7/1969 | Adinolfi | 137/296 |
| 3,709,249 | 1/1973 | Diaz | 137/296 |
| 3,840,041 | 10/1974 | McMurray | 137/296 |
| 3,935,877 | 2/1976 | Franceschi | 137/296 |
| 4,566,481 | 1/1986 | Leopold, Jr. et al. | 137/296 |

Primary Examiner—George L. Walton
Attorney, Agent, or Firm—Joseph P. Gastel

[57] ABSTRACT

An operating nut construction for a fire hydrant including a body member having a lower tapped portion for threadably receiving a fire hydrant valve rod, a sleeve rotatably mounted on the body member against axial movement, a cap rotatably mounted on the body member against axial movement, a narrow gap between the sleeve and the cap, and a plurality of shallow depressions in the body member aligned with the gap for reception of a specialized wrench having narrow shoulders thereon to turn the body member. The rotation of the sleeve or the cap or both will not turn the body member because they are rotatably mounted thereon.

21 Claims, 13 Drawing Figures

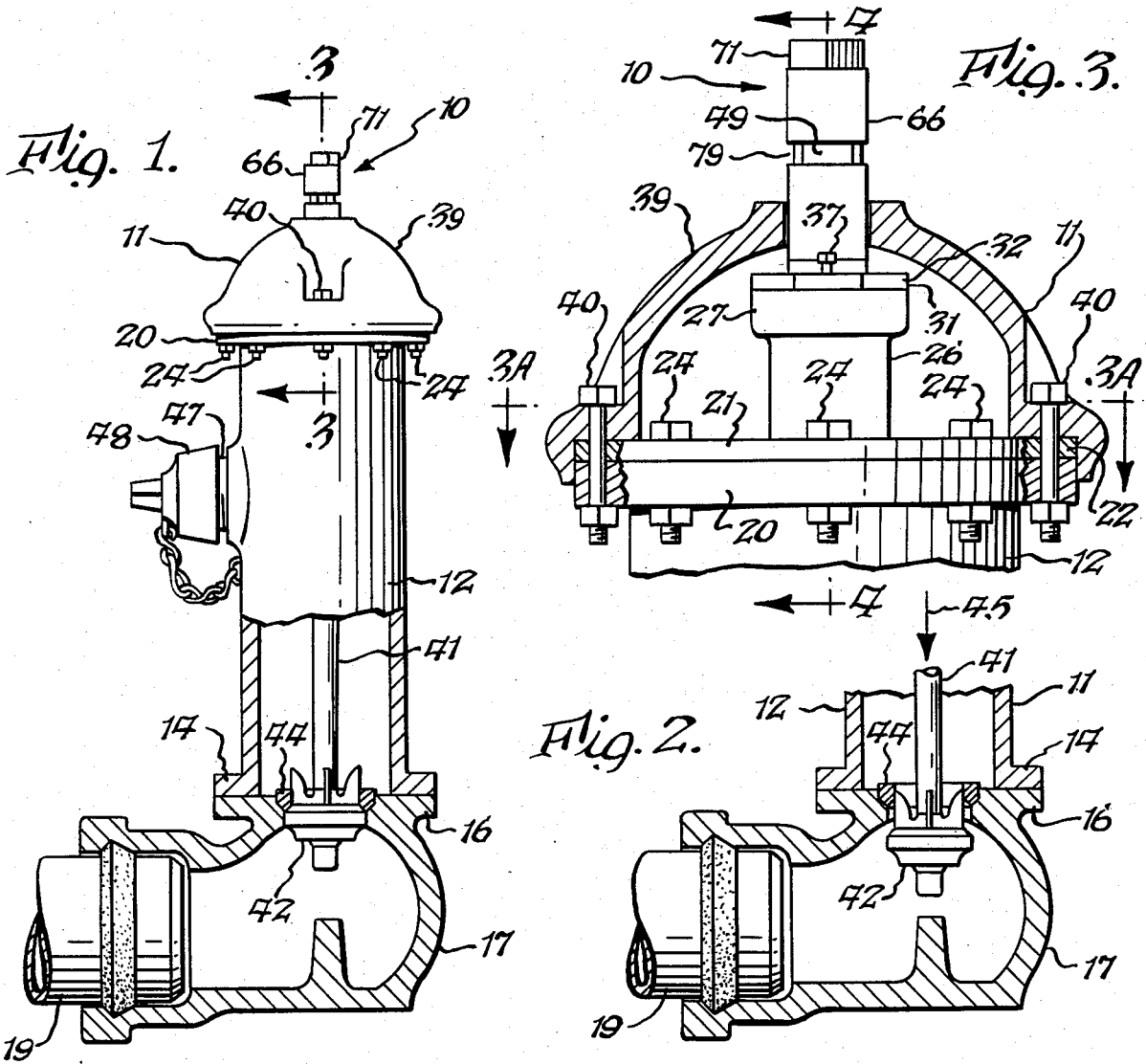

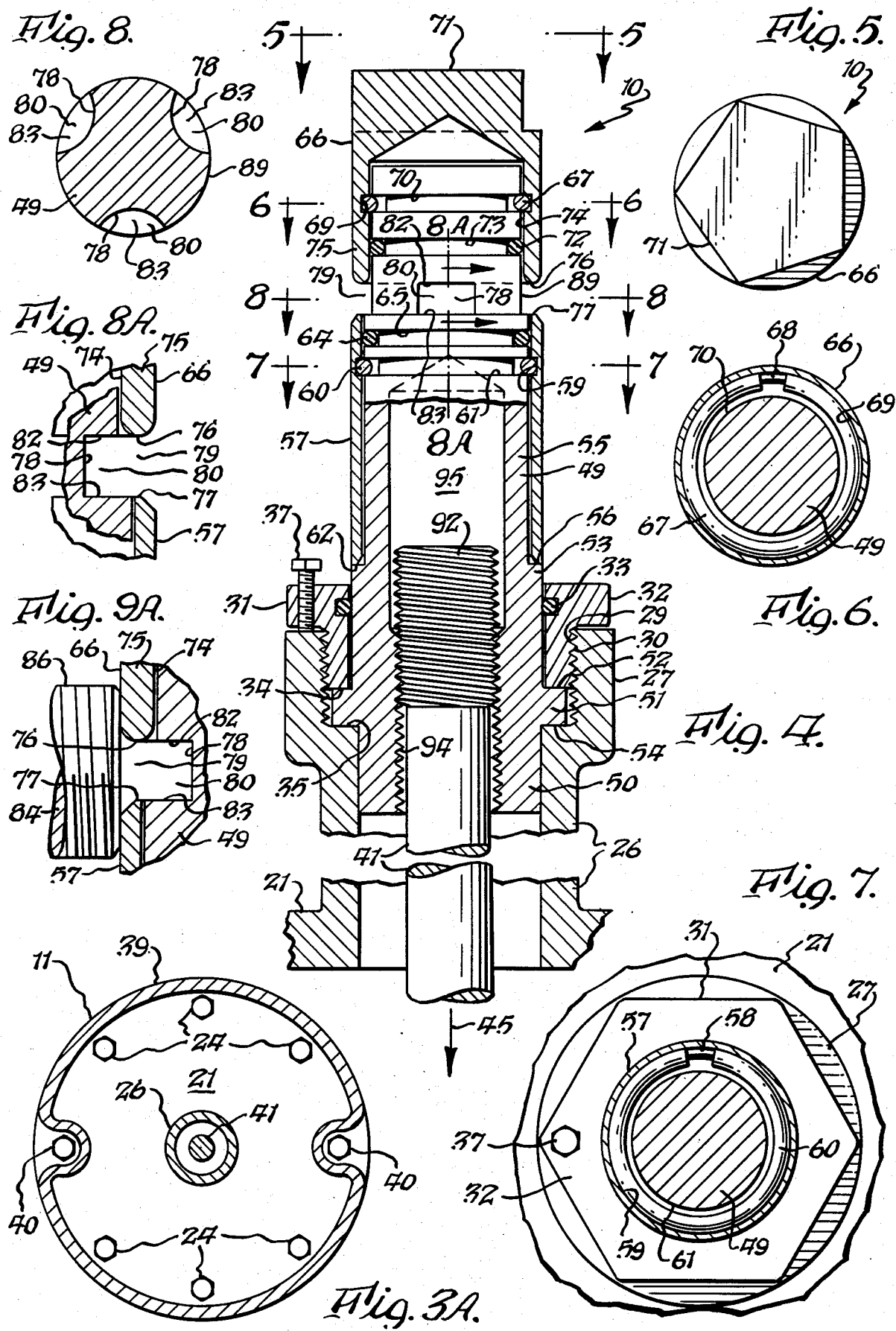

OPERATING NUT FOR FIRE HYDRANT

BACKGROUND OF THE INVENTION

The present invention relates to an improved operating nut construction for a fire hydrant.

By way of background, the unauthorized opening of fire hydrants with the attendant wasting of water has become an extremely great problem, especially considering the relative scarcity of water during periods of drought and further considering the attendant expense. The reason that fire hydrants could be opened easily by practially anyone is because the conventional operating nut could be turned by conventional wrenches.

SUMMARY OF THE INVENTION

It is the primary object of the present invention to provide an improved operating nut construction for a fire hydrant or for general purposes which can be operated only by a specialized wrench.

Another object of the present invention is to provide an improved operating nut construction of the present invention which is of a shape to replace existing operating nuts in fire hydrants while utilizing the existing mounting structure.

A further object of the present invention is to provide an improved operating nut construction for a fire hydrant having a plurality of parts which shield the portion of the nut which must be turned and which cannot be removed therefrom. Other objects and attendant advantages of the present invention will readily be perceived hereafter.

The present invention relates to an operating nut construction for a fire hydrant having a valve housing, a valve in said valve housing, a hydrant barrel having a lower barrel portion secured to said valve housing and an upper barrel portion remote from said valve housing, a valve rod having a lower rod portion secured to said valve and an upper rod portion proximate said upper barrel portion, a thread on said upper rod portion, a first shoulder at said upper barrel portion, a sleeve having a sleeve end threadably received within said upper barrel portion, and a second shoulder on said sleeve end spaced from and in opposition to said first shoulder: the operating nut construction comprising a body member having a lower end portion and an upper end portion and a central portion therebetween, a tapped bore in said lower end portion for threadably receiving said thread of said upper rod portion in mating relationship, a flange on said body member for placement between said first and second shoulders to thereby retain said body member against axial movement while permitting rotation thereof, a second sleeve, first mounting means mounting said second sleeve for rotation on said central portion of said body member while fixedly securing said second sleeve against axial movement relative to said body member, an upper end on said second sleeve, a cap, second mounting means rotatably mounting said cap above said second sleeve on said upper end portion of said body member while fixedly securing said cap against axial movement relative to said body member, a lower end on said cap axially spaced from said upper end of said second sleeve to thereby expose a narrow section of a central portion of said body member therebetween, and wrench-gripping configurations on said narrow section of said central portion of said body member.

The present invention also relates to an operating nut construction for a fire hydrant comprising a body member having a lower end portion and an upper end portion and a central portion therebetween, a tapped bore in said lower end portion for threadably receiving the thread of a valve rod in mating relationship, a flange extending outwardly on said body member proximate said central portion, a sleeve, first mounting means mounting said sleeve for rotation on said central portion of said body member while fixedly securing said sleeve against axial movement relative to said body member, an upper end on said sleeve, a cap, second mounting means rotatably mounting said cap above said sleeve on said upper end portion of said body member while fixedly securing said cap against axial movement relative to said body member, a lower end on said cap axially spaced from said upper end of said sleeve to thereby expose a narrow section of a central portion of said body member therebetween, and wrench-gripping configurations on said exposed narrow section of said central portion of said body member.

The present invention also relates to an operating nut construction comprising a body member having first and second opposite end portions and a central portion therebetween, coupling means on said first end portion for receiving an external member in connected relationship, a flange extending outwardly on said body member proximate said central portion, a sleeve, first mounting means mounting said sleeve for rotation on said central portion of said body member while fixedly securing said sleeve against axial movement relative to said body member, a first end on said sleeve, a member including a sleeve portion, second mounting means rotatably mounting said member on said second end portion of said body member in axially spaced relationship to said sleeve while fixedly securing said member against axial movement relative to said body member, a second end on said sleeve portion of said member axially spaced from said first end of said sleeve to thereby expose a narrow section of a central portion of said body member therebetween, and wrench-gripping configurations on said exposed narrow section of said central portion of said body member.

The present invention also relates to a wrench comprising a frame having an opening therein, an inner edge on said frame surrounding said opening, a plurality of shoulders secured to said inner edge and extending inwardly into said opening, a handle, mounting means for mounting said handle on said frame for movement into and out of said opening, and an end on said handle spaced from said shoulders.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view, partially broken away in cross section, showing a fire hydrant mounted on a main water conduit and mounting the improved operating nut construction and with the hydrant valve shown in closed position;

FIG. 2 is a fragmentary cross sectional view, similar to a portion of FIG. 1 and showing the hydrant valve in an open position;

FIG. 3 is a fragmentary cross sectional view taken substantially along line 3—3 of FIG. 1 and showing the interior construction of the top portion of the fire hydrant;

FIG. 3A is a diminutive fragmentary cross sectional view taken substantially along line 3A—3A of FIG. 3;

FIG. 4 is a fragmentary cross sectional view taken substantially along line 4—4 of FIG. 3 and showing the details of the operating nut construction;

FIG. 5 is a plan view of the top of the operating nut taken substantially in the direction of arrows 5—5 of FIG. 4;

FIG. 6 is a cross sectional view taken substantially along line 6—6 of FIG. 4 and showing the locking ring connection between the nut cap and the body member;

FIG. 7 is a cross sectional view taken substantially along line 7—7 of FIG. 4 and showing the locking ring connection between the rotatable sleeve and the body member;

FIG. 8 is a cross sectional view taken substantially along line 8—8 of FIG. 4 and showing the configuration of the wrench-gripping portion of the body member;

FIG. 8A is a fragmentary cross sectional view taken substantially along line 8A—8A of FIG. 4 and showing the contour of the wrench-receiving depressions and their relationship to the gap between the rotatable sleeve and cap;

FIG. 9 is a fragmentary plan view of the specialized wrench utilized to grip the body member of the operating nut;

FIG. 9A is a fragmentary cross sectional view taken substantially along line 9A—9A of FIG. 9 and showing the wrench handle in locking engagement with the operating nut sleeve and cap; and FIG. 10 is a fragmentary cross sectional view taken substantially along line 10—10 of FIG. 9.

DESCRIPTION OF THE PREFERRED EMBODIMENTS

The improved operating nut construction 10 of the present invention is intended to replace the conventional operating nut construction of fire hydrant 11, without requiring any modification of the existing fire hydrant structure. As expressed briefly above, a conventional nut can be turned by any type of wrench and therefore the hydrant valve can be opened by anyone. The improved operating nut 10 of the present invention can only be turned to open the hydrant valve with a specialized wrench used by authorized personnel.

The conventional fire hydrant 11 includes a barrel 12 having an upper barrel portion and a lower barrel portion. The lower barrel portion includes an annular flange 14 suitably connected, as by bolts (not shown) to annular flange 16 at the upper end of the fitting 17 at the end of main water conduit 19. The upper barrel portion includes an integral annular flange 20 at the upper end of barrel 12 and a circular operating nut carrying plate 21 which has its outer edge 22 mounted on annular flange 20 and secured thereto by a plurality of nut and bolt assemblies 24. An upstanding cylindrical sleeve 26 (FIGS. 3 and 4) has its lower portion formed integrally with circular plate 21, and it includes an enlarged cylindrical upper portion 27 which is tapped at 29 to receive the threaded portion 30 of sleeve 31, the upper portion of which is formed with a hexagonal head 32 for receiving a suitable wrench. A sealing O-ring 33 is carried by sleeve 31, and sleeve 31 terminates at annular shoulder 34. An annular shoulder 35 is formed on sleeve 26 in opposition to shoulder 34. Sleeve 31 is locked in position by means of a set screw 37.

A hydrant bonnet 39 is mounted on plate 21 and secured to the outer edge thereof by a pair of diametrically opposed nut and bolt assemblies 40 (FIGS. 3 and 3A). There are three nut and bolt assemblies 24 on one side of the diameter connecting nut and bolt assemblies 40 and there are three nut and bolt assemblies 24 on the opposite side of the diameter (FIG. 3A).

A valve rod 41 is actuated by the operating nut of the hydrant, and it carries a valve 42 at its lower end which is normally seated on annular seat 44 to prevent water in conduit 19 from entering barrel 12. When the hydrant is to be opened, the operating nut is rotated to move valve rod 41 axially downwardly in the direction of arrow 45 (FIGS. 2 and 4) to move valve 42 away from seat 44, thereby permitting water from conduit 19 to enter barrel 12 from which it is discharged from nipple 47 after cap 48 is removed therefrom. It is to be noted that since valve 42 moves downwardly away from annular seat 44, it must do so against the water pressure in conduit 19.

All of the foregoing hydrant structure, except operating nut 10, is conventional in the art and forms no part of the present invention except in the manner in which the hydrant structure coacts with the improved operating nut 10 of the present invention.

The improved operating nut construction 10 of the present invention includes an elongated substantially cylindrical body member 49 having an enlarged hollow cylindrical lower portion 50 with an external annular flange 51 having edges 52 and 54. Annular flange 51 is rotatably received between shoulders 34 and 35 and is thus retained against axial movement relative to sleeve 26. Body member 49 also includes a central portion 53 which includes a reduced hollow cylindrical portion 55 which is located above annular shoulder 56 of lower portion 50. A sleeve 57 includes an annular groove 59 which receives a locking ring 60 (FIGS. 4 and 7) which is also received in annular groove 61 of body member 49. The end 62 of sleeve 57 is in contiguous relationship to shoulder 56. A sealing O-ring 64 is located in annular groove 65 and bears against the inside of sleeve 57 to prevent water and debris from passing downwardly beyond it. Locking ring 60 prevents sleeve 57 from axial movement relative to body member 49 but permits free rotation thereof. Locking ring 60 is fabricated from suitably treated wire which snaps into the position shown in FIG. 7 after the parts are assembled as shown, and this is possible because of the gap 58 between the ends of the locking ring.

A freely rotatable cap 66 is mounted on the upper end of body member 49 and secured thereto against axial movement by locking ring 67 which is partially received in groove 69 of sleeve portion 75 of cap 66 and partially received in annular groove 70 of locking member 49. Locking ring 67 permits cap 66 to rotate freely but prevents it from moving axially. Locking ring 67 is constructed in the same manner as locking ring 60 with a gap 68 between the ends thereof. The top of cap 66 is formed in the shape of pentagonal solid 71 which resembles the conventional top of a conventional operating nut, which operating nut 10 of the present invention replaces. A sealing O-ring 72 is received in annular groove 73 of body member 49 and bears against the inside surface 74 of cap 66 for sealing purposes. The locking rings 60 and 67 are so strong that it is practically impossible to separate cap 66 and sleeve 57 from body member 49 after they have been assembled.

Further in accordance with the present invention, the lower end of sleeve portion 75 of cap 66 terminates at an annular shoulder 76 and the upper end of sleeve 57 terminates at annular shoulder 77. A narrow annular gap 79 therefore exists between ends 76 and 77. This gap 79 may be on the order of a quarter of an inch or less. A plurality of concave arcuate relatively shallow milled depressions 80 (FIGS. 4 and 8), which are spaced 120° apart, are formed on the central portion of body member 49, and they are aligned with gap 79 for access by a specialized wrench 81 (FIGS. 9 and 10). The area in which depressions 80 are located is hardened to prevent wear or deformation. Each depression 80 includes a concave surface 78, an upper edge 82 and a lower edge 83. Edges 82 and 83 are aligned with ends 76 and 77, respectively, of cap 66 and sleeve 57, respectively.

The body member 49 of operating nut 10 can be turned to effect axial movement of valve rod 41 only when gripped by wrench 81. Body member 49 cannot be rotated by turning either cap 66 or sleeve 57 because they are freely rotatable on body member 49. Actually cap 66 is in the nature of a decoy because it will turn if a wrench is applied thereto, and, in fact, it will turn if manipulated by hand so that someone attempting to open the hydrant valve will think that the nut is broken. If a conventional pipe wrench or the like is applied to the outside cylindrical surfaces of either cap 66 or sleeve 57 or both, they both will turn freely without effecting rotation of body member 49, which is required to open valve 42. Cap 66 and sleeve 57 are fabricated of extremely strong treated steel so that they cannot be deformed so as to destroy their rotative connection with body member 49.

The only way that body member 49 can be turned, as noted briefly above, is by the use of a specialized wrench 81 (FIGS. 9 and 10). Wrench 81 includes an elongated handle 84 which may be about a foot long. A frame 85 is threadably mounted on a threaded end 86 of handle 84. Frame 85 includes an opening 88 which is larger than the diameter of sleeve portion 75 of cap 66 so that it can move down over cap 66 until shoulders 87 are aligned with gap 79. Thereafter, frame 85 is moved radially relative to body member 49 until shoulders 87 abut the outer surface 89 of body member 49 which is located in gap 79. Thereafter, frame 85 is moved circumferentially until the arcuate surfaces 96 of shoulders 87 move into complementary mating engagement with two of the three arcuate depressions 80, as shown diagrammatically in FIG. 9. Thereafter, handle 84 is threaded inwardly from its solid line position in FIG. 9 to its dotted-line position where it abuts the outer surfaces of cap 66 and sleeve 57 (FIG. 9A), thereby locking shoulders 87 in the two depressions 80. Shoulders 87 each have an upper surface 90 (FIG. 10) and a lower surface 91 and the spacing between these surfaces is less than the spacing between surfaces 82 and 83 of depressions 80 so that there is no difficulty in shoulders 87 entering depressions 80. The frame 85 and especially shoulders 87 are formed of special hardened steel so that the torque required to turn body member 49 will not cause shoulders 87 to be severed from the remainder of frame 85. In this respect, an average of between about 80 and 120 foot pounds are required to turn body member 49 to cause valve rod 41 to move downwardly against the water pressure exerted on valve 42.

When valve 42 is closed, the threaded upper end 92 of valve rod 41 is received in tapped bore 94 and chamber 95 of body member 49 (FIG. 4). Cylindrical chamber 95 is of larger diameter than tapped bore 94. When body member 49 is turned in the proper direction by wrench 81, there will be relative rotation between threads 92 and 94 and since body member 49 is held against axial movement by flange 51, valve rod 41 will move downwardly in the direction of arrow 45 to thus unseat valve 42. Threads 94 are of left hand so that body member 49 has to be turned in a clockwise direction when viewed from the top to open the valve.

At this point it is to be noted that the conventional prior art operating nut, which is replaced by nut 10, has a flange such as 51 which is received between shoulders 34 and 35, but that the body member of the conventional operating nut terminates at a pentagonal end which can be gripped by a suitable wrench to turn the body member to move the valve rod. The improved operating nut construction of the present invention differs from the conventional prior art operating nut in that a cap 66 and sleeve 57 have been rotatably mounted on the body member with a wrench-gripping portion therebetween, as described above, so as to expose only a very small portion of the body member 49 which can only be gripped by a specialized wrench to turn it to move valve rod 45.

While the operating nut construction of the present invention has been described relative to a fire hydrant, it will be appreciated that it also can be used in other environments where the turning thereof has to be restricted to the use of a specialized wrench. Furthermore, while the instant operating nut has a cap with a blind bore therein, it will be appreciated that in certain circumstances the cap can be replaced with a rotatable sleeve open at both ends where the end of the sleeve remote from the wrench-gripping configurations is obstructed so that access cannot be had to the body member to turn the nut.

While preferred embodiments of the present invention has been disclosed, it will be appreciated that the present invention is not limited thereto but may be otherwise embodied within the scope of the following claims.

What is claimed is:

1. In a fire hydrant having a valve housing, a valve in said valve housing, a hydrant barrel having a lower barrel portion secured to said valve housing and an upper barrel portion remote from said valve housing, a valve rod having a lower rod portion secured to said valve and an upper rod portion proximate said upper barrel portion, a thread on said upper rod portion, a first shoulder at said upper barrel portion, a sleeve having a sleeve end threadably received within said upper barrel portion, and a second shoulder on said sleeve end spaced from and in opposition to said first shoulder: an operating nut construction for preventing unauthorized use of said fire hydrant comprising a body member having a lower end portion and an upper end portion and a central portion therebetween, a tapped bore in said lower end portion for threadably receiving said thread of said upper rod portion in mating relationship, a flange on said body member for placement between said first and second shoulders to thereby retain said body member against axial movement while permitting rotation thereof, a second sleeve, first mounting means mounting said second sleeve for rotation on said central portion of said body member without turning said body member whereby said rotation prevents unauthorized use of said fire hydrant, an upper end on said second sleeve, a cap, second mounting means rotatably mounting said cap above said second sleeve on said upper end portion of said body member while securing said cap against removal from said body member, said rotatable mounting of said cap on said body member preventing said cap from turning said body member and thus preventing unauthorized use of said fire hydrant, a lower end on said cap axially spaced from said upper end of said second sleeve to thereby expose a narrow section of a central portion of said body member therebetween, and wrench-gripping configurations on said narrow section of said central portion of said body member for receiving a wrench for turning said body member to operate said fire hydrant.

2. In a fire hydrant as set forth in claim 1 including a wrench-receiving configuration on said cap.

3. In a fire hydrant as set forth in claim 1 wherein said first mounting means includes a locking ring for fixedly securing said sleeve against axial movement relative to said body member.

4. In a fire hydrant as set forth in claim 1 wherein said second mounting means comprises a locking ring.

5. In a fire hydrant as set forth in claim 4 wherein said first mounting means includes a second locking ring for fixedly securing said sleeve against axial movement relative to said body member.

6. In a fire hydrant as set forth in claim 1 including an O-ring seal between said second sleeve and said body member proximate said exposed narrow section of said body member.

7. In a fire hydrant as set forth in claim 1 including an O-ring seal between said cap and said body member proximate said exposed narrow section of said body member.

8. In a fire hydrant as set forth in claim 7 including a second O-ring seal between said second sleeve and said body member proximate said exposed narrow section of said body member.

9. In a fire hydrant as set forth in claim 1 wherein said cap includes the configuration of the wrench-gripping portions of a nut.

10. In a fire hydrant as set forth in claim 1 wherein said wrench-gripping configurations comprise a plurality of circumferentially spaced arcuate depressions.

11. An operating nut construction for a fire hydrant comprising a body member having a lower end portion and an upper end portion and a central portion therebetween, a tapped bore in said lower end portion for threadably receiving the thread of a valve rod in mating relationship, a flange extending outwardly on said body member proximate said central portion, a sleeve having a portion adapted to be located externally of said fire hydrant, first mounting means mounting said sleeve for rotation on said central portion of said body member, said rotation of said sleeve being incapable of turning said body member and thus preventing unauthorized use of said fire hydrant, an upper end on said sleeve, a cap adapted to be positioned externally of said fire hydrant, second mounting means rotatably mounting said cap above said sleeve on said upper end portion of said body member while securing said cap against removal from said body member, said rotatable mounting of said cap on said body member preventing said cap from turning said body member and thus preventing unauthorized use of said fire hydrant, a lower end on said cap axially spaced from said upper end of said sleeve to thereby expose a narrow section of a central portion of said body member therebetween, and wrench-gripping configurations on said exposed narrow section of said central portion of said body member for receiving a wrench for turning said body member to operate said fire hydrant.

12. An operating nut construction for a fire hydrant as set forth in claim 11 wherein said first mounting means includes a locking ring for fixedly securing said sleeve against axial movement relative to said body member.

13. An operating nut construction for a fire hydrant as set forth in claim 11 wherein said second mounting means comprises a locking ring.

14. An operating nut construction for a fire hydrant as set forth in claim 13 wherein said first mounting means includes a locking ring for fixedly securing said sleeve against axial movement relative to said body member.

15. An operating nut construction for a fire hydrant as set forth in claim 11 wherein said wrench-gripping configurations comprise a plurality of circumferentially spaced arcuate depressions.

16. An operating nut construction for a device comprising a body member having first and second opposite end portions and a central portion therebetween, coupling means on said first end portion for receiving an external member for effecting relative movement therewith for operation of said device, a flange extending outwardly on said body member proximate said central portion, a sleeve having a portion adapted to be located externally of said device, first mounting means mounting said sleeve for rotation on said central portion of said body member without turning said body member whereby said rotation prevents unauthorized use of said device, a first end on said sleeve, a member including a sleeve portion adapted to be positioned externally of said device, second mounting means rotatably mounting said member in axially spaced relationship to said sleeve on said second end portion of said body member while securing said member against removal from said body member, said rotatable mounting of said member preventing turning of said body member when said member is rotated to thereby prevent unauthorized use of said device, a second end on said sleeve portion of said member axially spaced from said first end of said sleeve to thereby expose a narrow section of a central portion of said body member therebetween, and wrench-gripping configurations on said exposed narrow section of said central portion of said body member for receiving a wrench for turning said body member to effect operation of said device.

17. An operating nut construction as set forth in claim 16 wherein said member comprises a cap.

18. An operating nut construction as set forth in claim 16 wherein said first mounting means includes a locking ring for fixedly securing said sleeve against axial movement relative to said body member.

19. An operating nut construction as set forth in claim 16 wherein said second mounting means comprises a locking ring.

20. An operating nut construction as set forth in claim 19 wherein said first mounting means includes a locking ring for fixedly securing said sleeve against axial movement relative to said body member.

21. An operating nut construction as set forth in claim 16 wherein said wrench-gripping configurations comprise a plurality of circumferentially spaced arcuate depressions.

* * * * *